United States Patent [19]

Simon et al.

[11] Patent Number: 4,723,413
[45] Date of Patent: Feb. 9, 1988

[54] REVERSE FLOW COMBUSTION CHAMBER, ESPECIALLY REVERSE FLOW RING COMBUSTION CHAMBER, FOR GAS TURBINE PROPULSION UNITS, WITH AT LEAST ONE FLAME TUBE WALL FILM-COOLING ARRANGEMENT

[75] Inventors: Burkhard Simon, Roehrmoos; Franz Joos, Munich; Martin Rohlffs, Guending, all of Fed. Rep. of Germany

[73] Assignee: MTU Munuch, GmbH, Munich, Fed. Rep. of Germany

[21] Appl. No.: 932,279

[22] Filed: Nov. 19, 1986

[30] Foreign Application Priority Data

Nov. 19, 1985 [DE] Fed. Rep. of Germany ....... 3540942

[51] Int. Cl.⁴ .......................... F23R 3/54; F23R 3/52; F23R 3/08; F02C 7/18
[52] U.S. Cl. ...................................... 60/757; 60/760
[58] Field of Search ................ 60/757, 760, 759, 755, 60/752

[56] References Cited

U.S. PATENT DOCUMENTS

| | | | |
|---|---|---|---|
| 3,369,363 | 2/1968 | Campbell | 60/757 |
| 3,589,128 | 6/1971 | Sweet | 60/39.65 |
| 3,826,082 | 7/1974 | Smuland et al. | 60/757 |
| 3,831,854 | 8/1974 | Sato et al. | 60/760 |
| 3,845,620 | 11/1974 | Kenworthy | 60/39.65 |
| 3,978,662 | 9/1976 | DuBell et al. | 60/757 |
| 3,995,422 | 12/1976 | Stamm | 60/757 |
| 4,050,241 | 9/1977 | DuBell | 60/757 |
| 4,077,205 | 3/1978 | Pane et al. | 60/757 |
| 4,259,842 | 4/1981 | Koshofter et al. | 60/757 |
| 4,329,848 | 5/1982 | Caruel et al. | 60/757 |
| 4,566,280 | 1/1986 | Burr | 60/757 |

FOREIGN PATENT DOCUMENTS

| | | |
|---|---|---|
| 0049190 | 4/1982 | European Pat. Off. . |
| 91131 | 7/1981 | Japan ..................... 60/755 |
| 1309180 | 3/1973 | United Kingdom . |

Primary Examiner—Louis J. Casaregola
Assistant Examiner—Timothy S. Thorpe
Attorney, Agent, or Firm—Barnes & Thornburg

[57] ABSTRACT

A reverse flow combustion chamber includes an annular chamber enclosed between flame tube wall sections to which cooling air is so supplied from an outer annular channel acted upon with secondary air opposite the main flow direction in the flame tube in such a manner that the cooling air that it is blown out in the opposite flow direction film-like against an adjoining flame tube wall. For the purpose of a cooling film with extremely great travel length which is homogeneous over the entire circumference, the annular chamber is to be constructed flat elliptically in the combustion chamber longitudinal direction in such a manner that together with air catching or collecting bores which terminate radially and essentially tangentially in the downstream end of the annular chamber—in relation to the secondary flow—, a part of the supplied cooling air produces an independent recirculation vortex following the elliptical annular chamber contour which is provided for the equalization of the main cooling air flow supplied by way of the air collecting bores and deflected into the flame tube through about 90° in the direction of the main flow.

11 Claims, 1 Drawing Figure

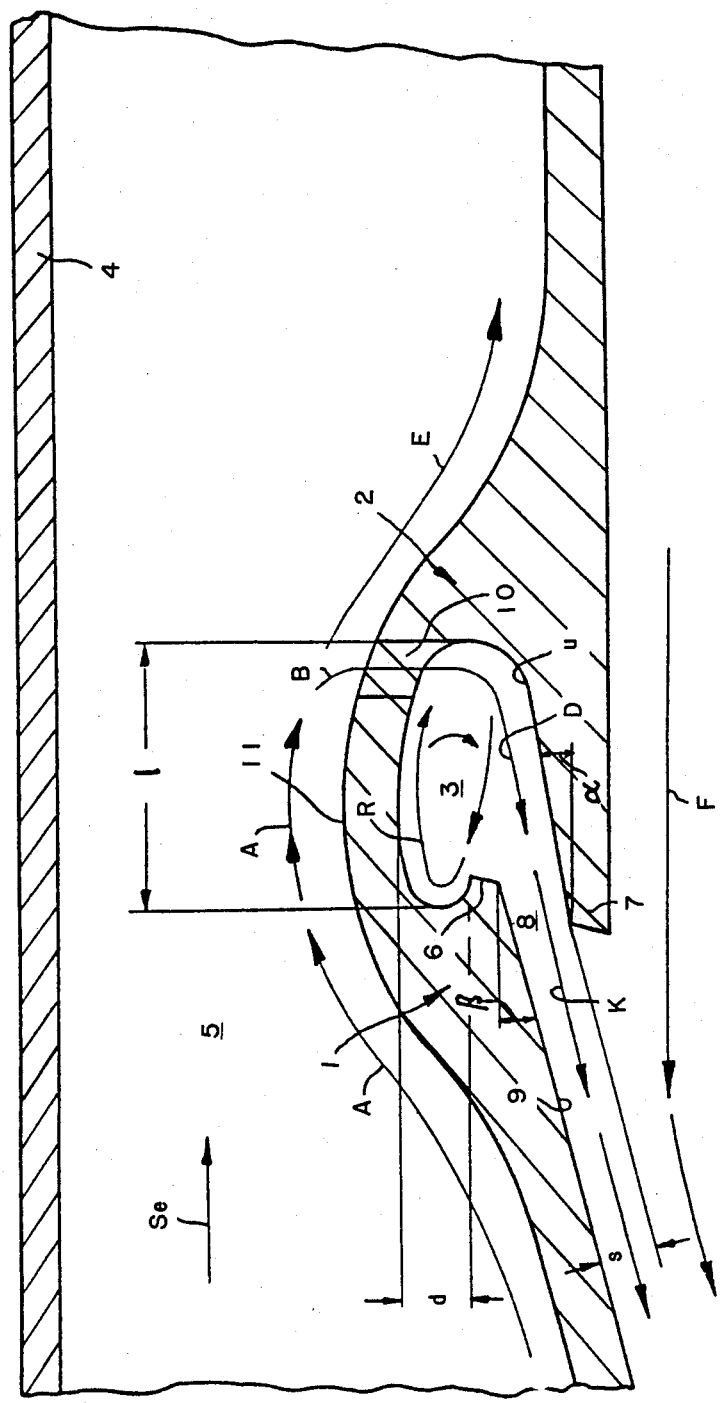

REVERSE FLOW COMBUSTION CHAMBER, ESPECIALLY REVERSE FLOW RING COMBUSTION CHAMBER, FOR GAS TURBINE PROPULSION UNITS, WITH AT LEAST ONE FLAME TUBE WALL FILM-COOLING ARRANGEMENT

The present invention relates to a reverse flow combustion chamber, especially to a reverse flow annular combustion chamber, for gas turbine propulsion units with a flame tube arranged inside of an outer housing structure, and with a cooling film arrangement which includes an annular chamber arranged between wall sections of the flame tube, to which cooling air is supplied from a secondary air channel located between the flame tube and the outer housing wall structure whereby the cooling air is blown out tangentially against the flame tube wall by way of an annular gap formed between adjacent flame tube wall ends.

Combustion chambers for gas turbine propulsion units are exposed to very high thermal loads by reason of the high combustion temperatures. As materials which can withstand these temperatures without cooling, cannot be used, the flame tube has to be cooled by appropriate cooling configurations. This is achieved in addition to a convection cooling primarily by a film cooling. With this method, the cooling air is blown into the combustion chamber through special openings in the flame tube wall in such a manner that a protective cooling film is formed at the flame tube inner wall downstream of the location where the cooling air is blown in.

As a result of the continuously increasing compressor pressure conditions and the combustion chamber inlet temperatures which increase thereby, cooling films with ever-increasing effectiveness must be used. For purposes of improving the cooling film effectiveness, two approaches exist in principle. One can improve, among others, the cooling configuration, i.e., the geometric construction of the blow-in location or one increases the rate of cooling air flow. Limits are imposed on the latter approach in that with highly loaded gas turbines the cooling air quantity is limited because a large part of the available air is required as mixing air for the control of the temperature profile at the turbine inlet.

A considerable problem for the cooling film formation in highly loaded reverse flow combustion chambers resides in that an oppositely directed flow exists in the outer secondary channel in relation to the flow in the flame tube. The impact-cooling films which have been used heretofore are not sufficiently effective in order to cool thermally highly loaded flame tube walls. The cooling films are then produced either with relatively high rates of air flow and therefore with relatively large air collecting bores, or by reason of an inadequate travel length of the cooling film are complemented at small rates of flow by numerous further cooling film installations.

With a view to achieve an optimum cooling film formation in reverse flow combustion chambers, an absolutely necessary prerequisite is to create a very good charging of the respective ring or impact chamber as well as a greatest possible travel length of the cooling film in the hot gas flow.

The combined prerequisite again depends directly on the type and construction of the secondary flow detachment caused by the cooling film arrangement in the secondary channel.

Dependent on the degree and extent of the secondary flow detachment, the convection cooling of the cooling film arrangement is again influenced disadvantageously more or less strongly.

A further prerequisite of an optimum cooling film arrangement is the creation of a cooling film with relatively large travel length which is homogeneous over the entire circumference, if one succeeds to build up a film with low turbulence that is equalized in the radial and circumferential direction.

Furthermore, one aims at an aerodynamically low-loss, homogeneous and low-consumption jet deflection by way of the respective cooling film arrangement.

In a prior art reverse flow combustion chamber as disclosed in the U.S. Pat. No. 3,589,128, flame tube wall parts which overlap telescopically and thereby enclose among each other an annular gap discharging in the flame tube, are connected with each other by way of deflection scoops. The respective deflection scoop is so secured at one flame tube wall part that it surrounds the other flame tube wall part at the end thereof, outside as undulated sheet metal bandage with enclosure of an annular- or deflection-chamber communicating with the respective annular gap; axially directed air supply channels opening against the secondary air stream in the outer ring channel are delimited by these undulated sheet metal bandages which are in communication with the annular chamber.

The film-cooling air to be supplied to the individual air supply channels mus thereby be deflected "rigorously" through at least 180° by way of the respective annular chamber with relatively large aerodynamic losses.

It is thereby further disadvantageous that at least comparatively strong secondary flow detachments must be expected at least at the downstream, strongly step-shaped section of the deflection scoop, which not only jeopardize a homogeneous convection cooling of the scoop in a far-reaching manner but also—in relation to the main flow in the flame tube—may aerodynamically impair other flame tube loads which take place upstream of the arrangement.

Furthermore, as a consequence of the air supply channels of relatively large diameter which are constructed in the prior art from undulated sheet metal band material, no accurately defined air quantity admixture in the form of discrete air jets is possible as desired in modern installations of this type. With a view to comparatively small rates of cooling air flow which are additionally required in modern installations of this type, "minute" admixture slots which can hardly be realized in practice, would result in the course of the entire undulated sheet metal band construction. This prior art can therefore be understood as an arrangement which, in addition to the aforementioned shortcomings, requires a comparatively large rate of flow of cooling air quantity as well as a corresponding high cooling air consumption.

A cooling film arrangement for gas turbine propulsion units is disclosed in the German Patent No. 20 54 002 (see also British Patent No. 1,309,180) in which openings distributed over the flame tube circumference for the passage of the cooling air into the flame tube are arranged in at least one bulge of the wall extending about the flame tube and are shielded against the flame space by a shielding plate or baffle, with which they are to be in fluid communication by way of an outlet for the cooling air film directed in the same direction in relation to the main flow direction in the flame tube.

The aforementioned openings, respectively, air supply bores, are thereby to be arranged primarily downstream of the apex of the respective bulge or annular chamber, in relation to the main flow direction of the combustion gases.

This prior art arrangement includes no definitive indication from which direction air is to flow against the aforementioned bulge in a combustion chamber secondary air channel. At any rate, in this prior art arrangement, the bulge protrudes relatively far radially into the secondary air channel with the use of a comparatively large bulge, respectively, annular chamber height; consequently, in this prior art arrangement, the annular chamber together with the bulge therefore protrudes into the secondary flow in the course of a relatively abrupt and radially strongly pronounced curvature configuration.

It follows therefrom that the respective bulge (bead) may be expected to cause relatively large secondary flow detachment losses primarily along the upstream as well as the downstream side.

A very poor air charge of the annular chamber must thus be expected in the behavior with the opening-, respectively, air supply bore-arrangement in the case of this prior art as well as taking into consideration a reverse flow combustion chamber concept—in which the secondary air flow flows opposite the main flow in the flame tube—, because the air supply bores are located in the detachment area. A comparatively small travel length of the "cooling film" in the hot gas stream follows therefrom.

The flow swirl or turbulence which has to be achieved in this prior art case for homogenizing the cooling air stream leaving the respective annular gap in the course of the local air supply bore arrangement and chamber construction causes comparatively large jet deflection losses because the predominant mass component of the cooling air flow to be supplied must be deflected through about 270°. A relatively large cooling air consumption, in turn, results therefrom again.

The relatively large and pronounced secondary flow detachments caused by air turbulence batches, as already mentioned in connection with this prior art arrangement, become effective disadvantageously on an aimed-at homogeneous convection cooling of the surrounding annular chamber walls.

A cooling film arrangement for gas turbine propulsion units is described in the DE-OS No. 24 06 277 to which belong also, inter alia, the French Patent No. 22 17 584, the British Patent No. 1,459,500 and the U.S. Pat. No. 3,845,620, which is similar to that of the aforementioned German Patent No. 20 54 002 and, for the same reason, entails to a large extent the same shortcomings.

Also, the arrangement in the DE-OS No. 24 06 277 does not involve a cooling film arrangement conceived or suitable for reverse flow combustion chambers.

Also, with this prior art solution, the combined prerequisite for optimum charging and high penetration depth cannot be fulfilled because the flow swirl-deflection chamber which projects into the secondary channel offset relatively abruptly, step-like with respect to the flame tube walls, are expected to cause in the secondary channel along the downstream or upstream annular chamber zones, relatively pronounced turbulence—and therewith detachment zones of the secondary flow—be it whether the air supply bores are to be arranged in the upstream or in the downstream lateral annular chamber walls. With this last-mentioned prior art solution, the corresponding air-collecting bores are always to be so arranged that the air jets which pass therethrough impinge initially on an oppositely disposed wall (diffusion), before they can be deflected in the direction toward the annular gap.

Especially in the course of this diffusion effect, this prior art solution seeks to create a circumferential velocity homogenization, respectively, a flow as free from turbulence as possible of the film-cooling air leaving the gap. However, it should prove difficult in connection therewith to be able to actually prepare the high-turbulence zones which are produced at the wall zones adjacent the corresponding air-collecting bores to the desired extent, i.e., in the sense of an actually "turbulence-free" film-cooling air discharge flow because the flow conditions (indifferent) produced by the diffusion cannot be clearly monitored.

In addition to comparatively high jet deflection losses and a comparatively high cooling air consumption, it will also be considered as disadvantageous in this prior art arrangement, that one is unable to produce a homogeneous optimum cooling of the wall sections which are highly thermally stressed in modern combustion chambers and form the respective annular or swirl chamber, as a consequence of the mentioned secondary air detachments.

A prior art cooling film arrangement for gas turbine combustion chambers is disclosed in the EP-PS No. 00 49 190 which does not deal in any point with the special requirements of a reverse flow combustion chamber, especially as regards the minimization of the jet deflection losses. In other words, in this prior art patent, an identical flow direction of the secondary channel air and of the combustion gases in the flame tube is a prerequisite. This prior art cooling film arrangement is formed between radially spaced mutually overlapping flame tube sections which enclose therebetween a ring-shaped chamber that is stepped-off essentially square. One or several parallel rows of air supply bores are thereby to be arranged in the respective upper chamber wall, by way of which impact cooling air is to be directed with relatively high velocity onto the corresponding oppositely disposed inner chamber wall that protrudes radially relatively far into the combustion space.

In this prior art arrangement, the respective outer chamber wall protruding into the secondary channel is to be constructed in the interest of as small as possible a secondary air detachment conically rising relatively flat, respectively, conically dropping off relatively flat on the upstream, respectively, downstream side.

However, these features are obtained with the disadvantage that the respective inner chamber wall must protrude relatively far toward the combustion space in order to be able to form at all the annular chamber necessary for the cooling film preparation. Not only a comparatively high burn-up danger of the inner chamber wall, but also an undesired preheating of the cooling air ahead of its inlet into the flame tube can be expected thereby.

The last-mentioned shortcomings could be eliminated again, at best only partly by means of a comparatively high and aimed-at locally distributed impact cooling air flow rate.

Additionally, the last-mentioned solution presupposes for the cooling film optimization a relatively long (L) cooling medium discharge channel out of the annular chamber, and therewith again a comparatively axially far projecting inner shielding lip which, as known in practice is exposed to a relatively high burn-up wear as well as locally high alternate thermal loads, as a result of which the desired homogeneous cooling film formation is again impaired, inter alia.

The present invention is concerned with the task to provide a cooling film arrangement suitable for a reverse flow combustion chamber of the type indicated hereinabove which with low jet deflection losses and low cooling air consumption produces a cooling film linked with an extremely great travel length and homogeneously distributed over the entire circumference.

The underlying problems are solved according to the present invention in that the annular chamber is constructed flat elliptically in the flame tube longitudinal direction and protrudes bulged with a small angle into the secondary air channel on the upstream as well as downstream side, in that in relation to the flow direction in the secondary air channel, radial bores are provided tangentially terminating in the downstream end of the annular chamber and arranged parallel adjacent one another, by means of which the cooling air in the form of discrete air jets is directed against a deflection zone on the inside of the chamber, from which takes place splitting off of a partial flow of the cooling air into an independent recirculation swirl following the annular chamber contour as well as into a main cooling air stream flowing off toward the annular gap. An inner one of the two flame tube wall ends forming the annular gap includes a peel-off lip directed opposite the cooling air flow in the annular chamber as being disclosed as a further embodiment of the invention.

By reason of the annular chamber which is embedded relatively flat elliptically inside of the secondary channel, combined with a corresponding flat aerodynamically favorable selectivity of the corresponding flame tube sections in the secondary channel, a flow deflection can be realized connected with relatively low jet deflection losses by means of the described air collecting bore arrangement with full utilization of the chamber interior length; by reason of the aerodynamically unimpaired air take-off, an extraordinarily favorable air charging of the annular chamber with simultaneous large travel length of the cooling film is thus assured, whereby the described arrangement of the air collecting bores itself again assures a detachment-free flow in the secondary channel which favors a high convection cooling effectiveness of the arrangement.

The partial split off of the flow in accordance with the present invention becomes effective extraordinarily advantageously on a cooling film that is homogeneous axially and radially over the entire circumference; the recirculation vortex following far-reachingly the flat elliptical inner contour thereby fills the "aerodynamic gaps" between the discrete air jets supplied by way of the air collecting bores. It is thereby quite significant for the invention that the air component which falls on the respectively split off recirculation vortex maybe only half as large or even smaller than half of the overall through-flowing air quantity, in favor of relatively small chamber dimensions, especially as concerns the radial structural height in view of the flat construction.

Advantageously, a cooling film arrangement with an extremely short axial lip overhang may additionally be obtained with the present invention; bulges or bellying protrusions projecting into the hot gas flow as well as their disadvantageous consequences are avoided.

These and other objects, features and advantages of the present invention will become more apparent from the following description when taken in connection with the accompanying drawing which shows, for purposes of illustration only, one embodiment in accordance with the present invention, and wherein:

The single figure is a partial longitudinal cross-sectional view through a reverse flow combustion chamber section in accordance with the present invention.

Referring now to the single figure of the drawing, in a reverse flow combustion chamber of a gas turbine propulsion unit of which a section is illustrated in the drawing, at least one flame tube wall film cooling arrangement is to include a swirl-chamber-like annular space 3 connected between two flame tube wall sections 1 and 2; cooling air in the form of discrete air jets B is to be supplied to this annular space 3 in the illustrated embodiment, for example, from an outer annular channel 5 formed between the flame tube and a combustion chamber outer housing structure 4 through which secondary air Se flows opposite the main flow direction F in the flame tube; after corresponding preparation RD, the cooling air is to be blown out of the annular space 3 in a reverse flow direction by way of an annular gap 8 formed between lip-like, mutually overlapping ends 6 and 7 of the flame tube wall sections 1 and 2 in a film-like manner according to the sequence of arrows K against the flame tube wall 9 adjoining the same. Within the scope of the basic inventive concept according to the present invention, the annular chamber 3 is to be constructed flat elliptically in the combustion chamber longitudinal direction in such a manner that together with air collecting or air pick-up bores 10 which discharge into the downstream end of the annular chamber 3 (in relation to the secondary air flow direction Se, A) and arranged parallel and in relatively close sequence adjacent one another, a portion of the supplied cooling air produces an independent recirculation swirl or vortex R following the elliptical annular chamber contour, which is provided for the equalization of the main cooling air stream D,K supplied by way of the air collecting bores 10 initially in the sense of discrete air jets B and deflected into the flame tube through about 90° in the direction of the main flow F.

In an advantageous construction according to the present invention, the flame tube wall sections 1 and 2 enclosing the annular space 3 and the annular gap 8 are to protrude toward the secondary air flow Se in the annular channel 5 by means of a bulge 11 which rises uniformly flatly on the upstream side and again uniformly flatly drops off on the downstream side. According to the sequence of arrows A,E the respective wall sections 1 and 2 are thereby homogeneously circumcirculated detachment-free and are optimally convectively cooled.

As can be further seen from the drawing, the partial stream splitting for the purpose of forming the rotary vortex R as well as the main flow deflection thus takes place at a main deflection wall zone U of the annular chamber 3 disposed opposite the air collecting or pick-up bores 10. For example, in the instant case the inner wall of the annular chamber 3 extends from this zone U continuously tapering in the direction toward the associated lip end 7.

Within the scope of an advantageous construction, the annular chamber 3 may be constructed four-times longer (1) than high, whereby the relative annular chamber height (d) and the cooling film gap width (s) are dimensionally approximately equal.

As further shown in the drawing, the angle of inclination α of the continuously tapering inner wall on the side surrounding the main cooling air stream D,K is essentially equal to the angle β of the flame tube wall sections 1,9 surrounding the main cooling air stream D,K on the opposite side and terminating toward the remaining lip end 6. Stated more accurately, the respective angles of inclinations α, β are therefore referred to thereby in relation to the common combustion chamber longitudinal center plane whereby one would have to start with the assumption that, for example, the flame tube wall 11 extends parallel to the combustion chamber longitudinal center plane. In view of the mentioned wall angles, an annular gap 8 can thus be obtained which is of parallel-walled construction or which—as shown—tapers slightly conically in the direction of the cooling film flow D,K.

As further shown in the drawing, the main flow deflection proceeds thereat from B to D through a slightly smaller angular amount than 90° as a consequence of the inclined arrangement of the main cooling air stream K out of the annular gap 8 inclined in the indicated sense.

However, the present invention could also be utilized advantageously without any problem if a cooling film flow extending parallel to the combustion chamber longitudinal center plane is required in view of the correspondingly arcuate flame tube wall geometry whereby the flow from B to D could then be deflected accurately or approximately through 90°.

The reference character D thus designates in the drawing the main cooling air stream prepared on the side of the annular chamber while reference character K designates the cooling film formed from the latter.

The sequence of arrows A,E designates the attainable homogeneous, detachment-free flow course of the secondary flow along the arrangement in the outer ring channel 5. It is thereby additionally important in the present invention that the air collecting bores 10, as a consequence of the indicated arrangement thereof, do not cause any wake secondary flow detachments so that the secondary flow (arrow E) proceeds homogeneously also downstream of the bores 10; it is thus possible to utilize the impulse of the static pressure for the mixing or combustion air charge of the flame tube at the upstream side of the cooling film arrangement—in relation to the main flow direction F.

The lip 6 constructed according to the present invention has the function of a "Peel-off lip", i.e., it effects inside of the annular chamber 3 an unequivocal flow split-up into the recirculation flow R and into the main cooling air flow D split off from the main deflection in favor of an extremely great length of travel of the cooling film K.

The detachment-free flow (arrow E) in the secondary channel S is extraordinarily advantageous additionally, for example, for an optimum operation of another cooling film arrangement constructed in the sense according to the present invention which is arranged further upstream of the illustrated cooling film arrangement, in relation to the main flow direction F.

As already mentioned, the present invention provides a mass flow division D,R in which the split-off rotary swirl R—under 180° deflection—again impinges on the mass flow B. The vortex R splits off thereat and fills the interstices between the discrete mass flow jets B.

Additionally, the local arrangement of the air collecting bores 10 becomes favorably effective on a comparatively slight, relative structural height d of the swirl chamber.

As regards the desired homogeneity of the cooling film K, it is important in that, on the one hand, the supplied discrete jets B expand and become wider in the annular chamber 3 in addition to the wall friction, by a deflection through about 90° while, on the other hand, the volumes between the discrete jets B are filled out by the split-off rotary swirl R.

The cooling film effectiveness is additionally very high in that, on the one hand, the wall friction of the air flow in the annular chamber 3 can be estimated to be relatively small while, on the other hand, the direction of the rotary swirl R is in the same direction as the direction of the discrete air mass jets B and is correspondingly low in losses.

The local discharge place of the air supply bores 10 into the annular chamber 3, as to the rest, could also be so described according to the present invention that the air collecting bores 10 terminate in the annular chamber 3 at the upflow end of the annular chamber 3—in relation to the main flow direction F in the flame tube.

While we have shown and described only one embodiment in accordance with the present invention, it is understood that the same is not limited thereto but is susceptible of numerous changes and modifications as known to those skilled in the art. For example, the present invention can also be used advantageously with pipe combustion chambers. Accordingly, we do not wish to be limited to the details shown and described herein but intend to cover all such changes and modifications as are encompassed by the scope of the appended claims.

We claim:

1. A reverse flow combustion chamber for gas turbine propulsion unit comprising:
   an outer housing;
   flame tube means within said outer housing and including tube wall sections and annular chamber means between said tube wall sections, said tube wall sections having radial inner and outer portions;
   a second air channel located between said flame tube means and said outer housing and having an air flow in a first longitudinal direction;
   an annular gap means between said radial inner and outer portions and in communication with said annular chamber means for providing cooling air film along walls of said flame tube means in a second longitudinal direction opposite said first longitudinal direction;
   said annular chamber means having a flat ellipitical shaped interior in said first longitudinal direction of said flame tube means and having chamber wall sections extending into said secondary air channel at small acute angles on the upstream and downstream side with respect to said first air flow direction to form a projecting bulge;
   a plurality of spaced radial bores in said bulge terminating tangentially to the downstream side of said annular chamber interior to produce discrete air jets; and deflection means in said annular chamber means for splitting said discrete air jets into a first portion flowing into said annular gap means and a second portion recirculating along said elliptical interior to be combined with said discrete air jets.

2. A reverse flow combustion chamber according to claim 1 wherein said deflection means includes a peel-off lip means at the radial outer portion of said tube wall section directed toward said discrete air jet flow.

3. A reverse flow combustion chamber according to claim 1 wherein said adjacent radial bores have parallel axes.

4. A reverse flow combustion chamber according to claim 1 wherein a major axis of the elliptical interior of the annular chamber means in said longitudinal direction is approximately equal to four times a minor axis in the radial direction and the width of said annular gap means is equal to said annular chamber means minor axis.

5. A reverse flow combustion chamber according to claim 4 wherein said radially inner and outer portions of said tube wall section are inclined at substantially the same angle with respect to said longitudinal directions to form approximately parallel-walled air gap means.

6. A reverse flow combustion chamber according to claim 5 wherein said approximately parallel walled annular air gap converges toward an outlet.

7. A reverse flow combustion chamber according to claim 5 wherein said adjacent radial bores have parallel axis and are spaced close to each other circumferentially.

8. A reverse flow combustion chamber according to claim 1 wherein said radially inner and outer portions of said tube wall section are inclined at substantially the same angle with respect to said longitudinal directions to form approximately parallel-walled air gap means.

9. A reverse flow combustion chamber according to claim 8 wherein said approximately parallel walled annular air gap means converges toward an outlet.

10. A reverse flow combustion chamber according to claim 9 wherein said adjacent radial bores have parallel axis and are spaced close to each other circumferentially.

11. A reverse flow combustion chamber according to claim 1, wherein the combustion chamber is a reverse flow annular combustion chamber.

* * * * *